April 1, 1930.  W. CAMERON  1,752,328
SQUARE CAN CAP SEAMING MECHANISM
Filed Aug. 30, 1926  9 Sheets-Sheet 4
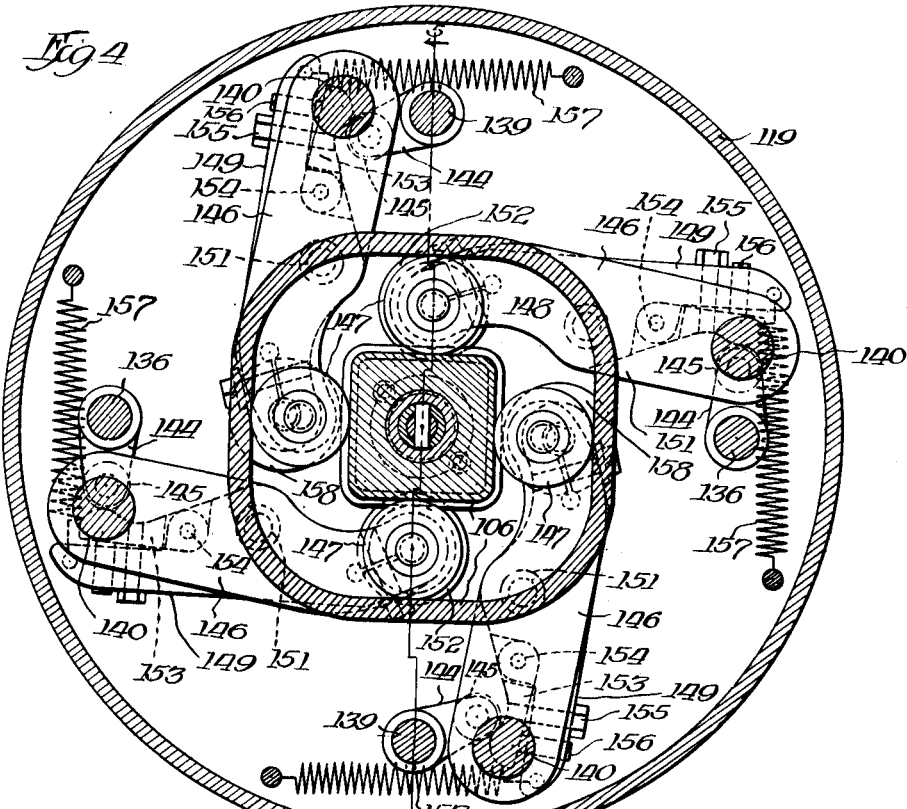
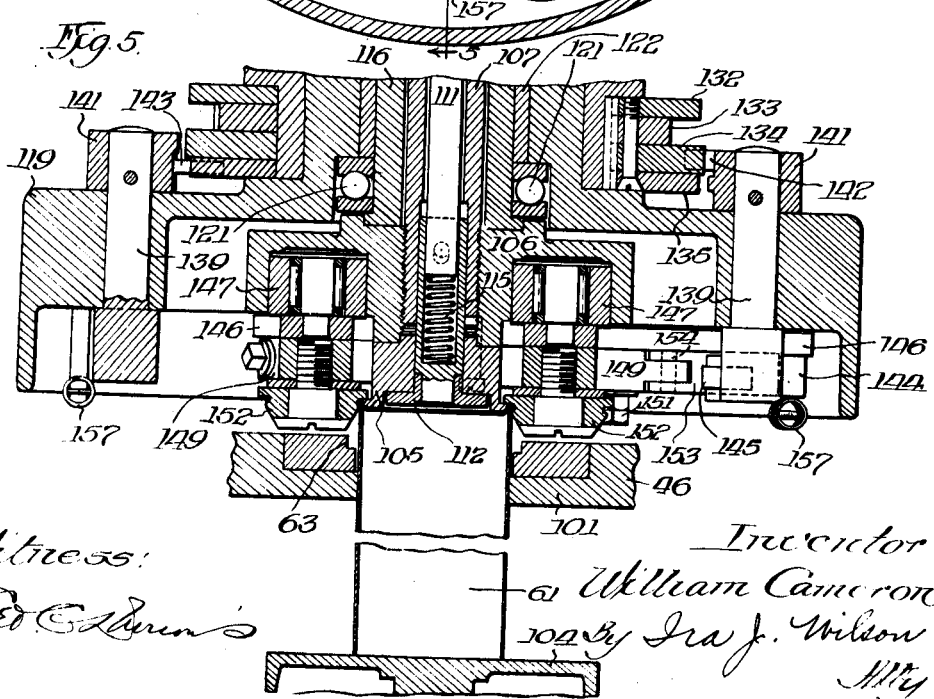

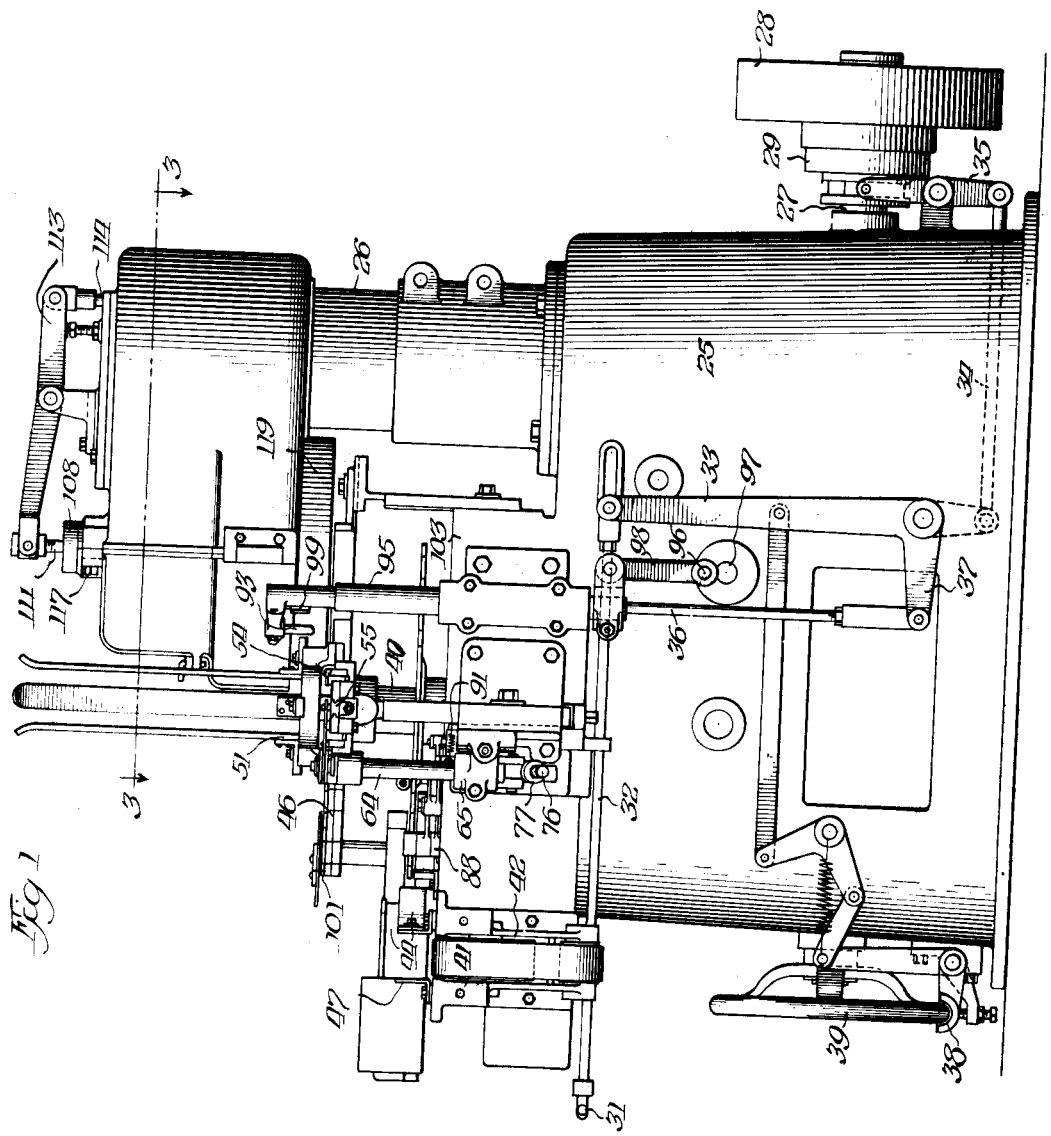

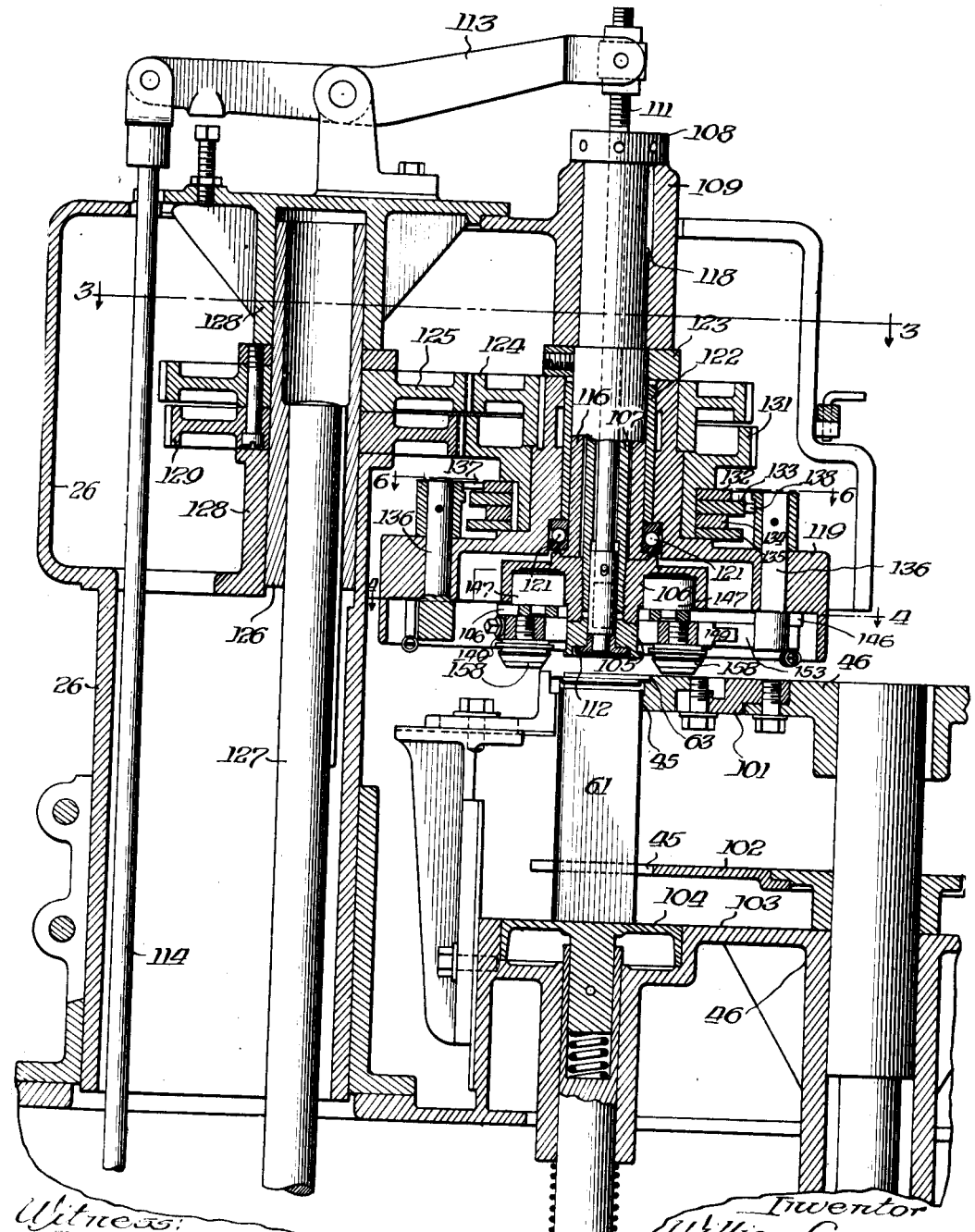

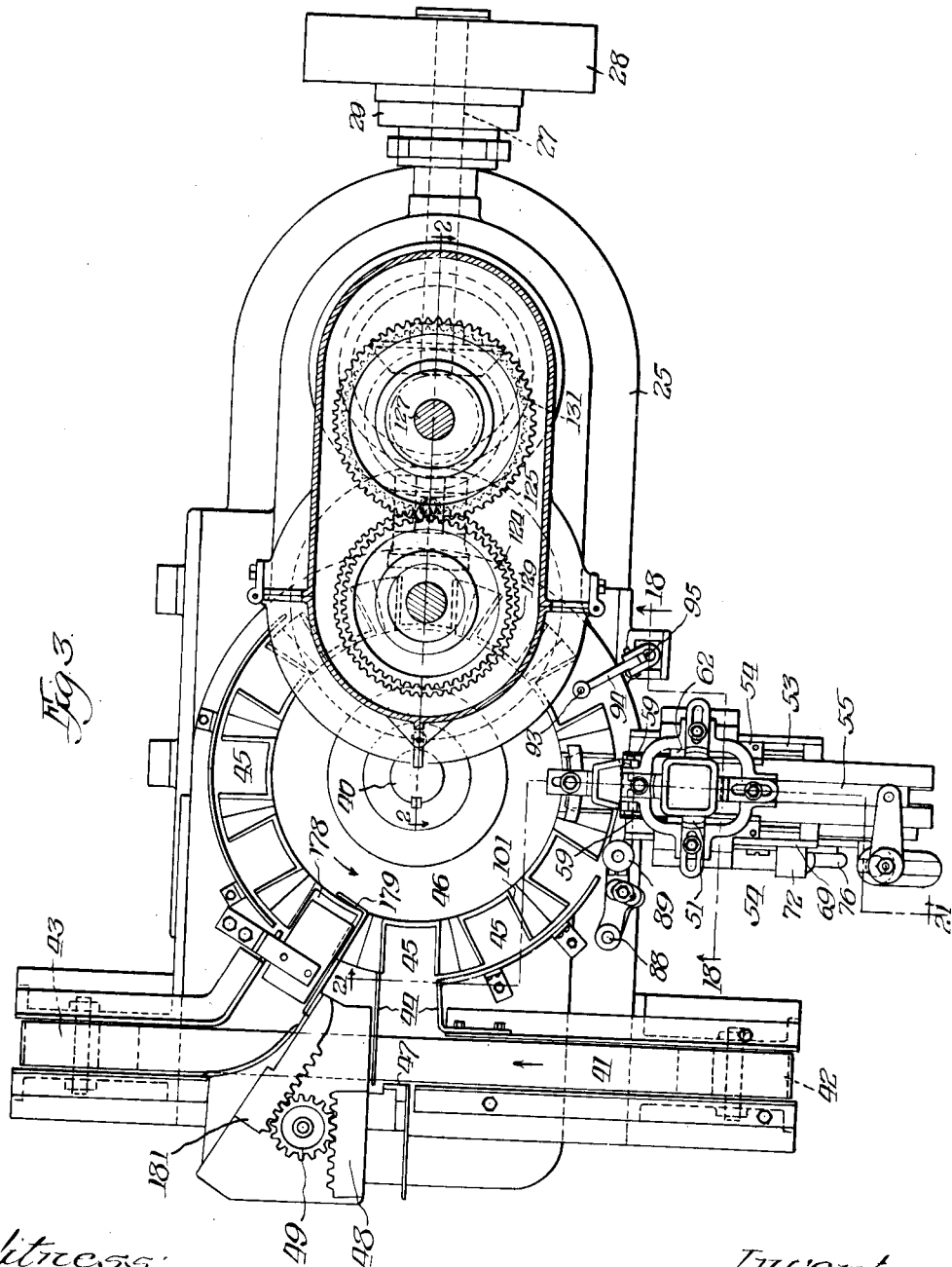

April 1, 1930.  W. CAMERON  1,752,328
SQUARE CAN CAP SEAMING MECHANISM
Filed Aug. 30, 1926   9 Sheets-Sheet 5
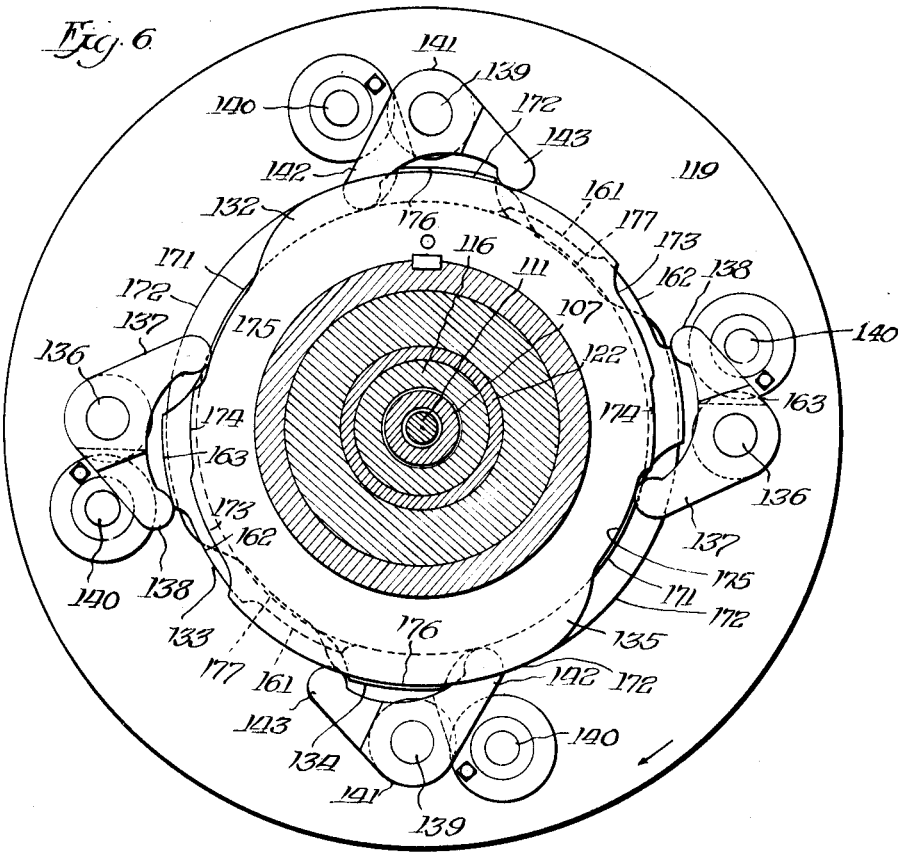
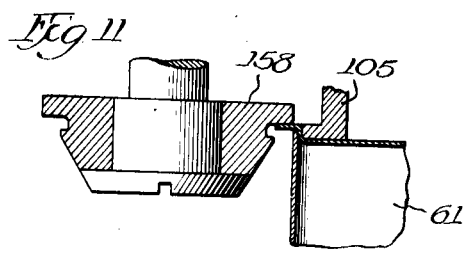
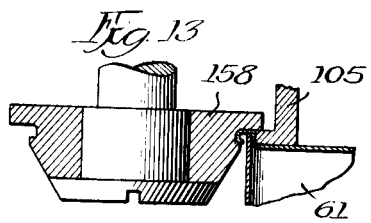
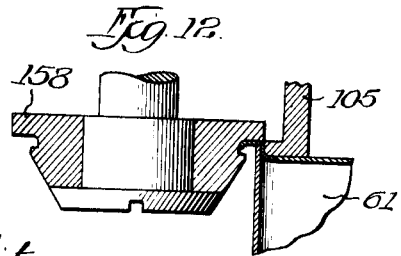
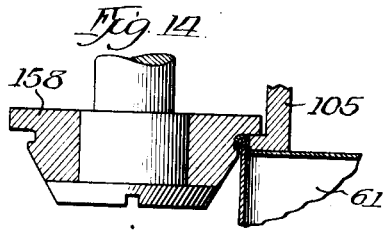
Witness:
Geo. G. O'Brien
Inventor
William Cameron
By Ira J. Wilson
Atty.

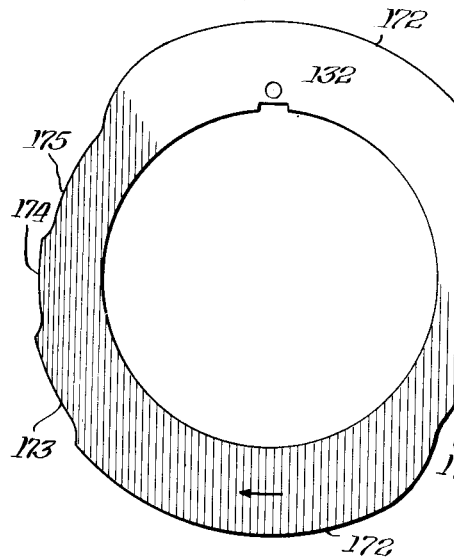
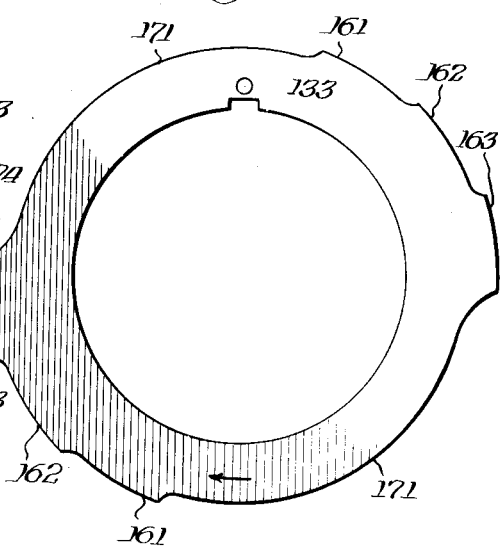
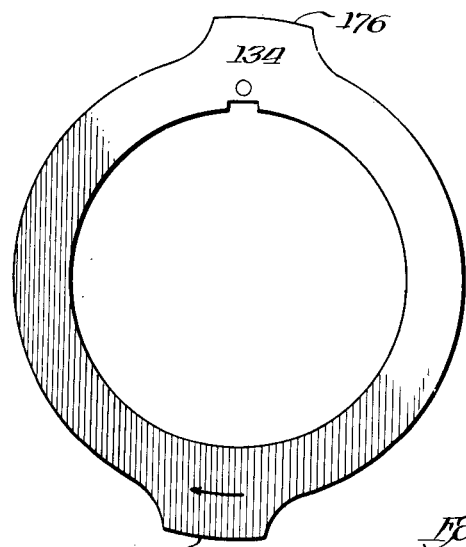
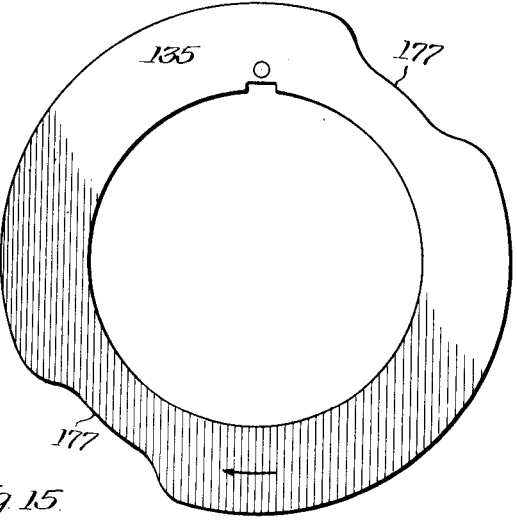
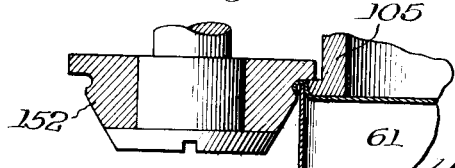

April 1, 1930.  W. CAMERON  1,752,328
SQUARE CAN CAP SEAMING MECHANISM
Filed Aug. 30, 1926  9 Sheets-Sheet 7
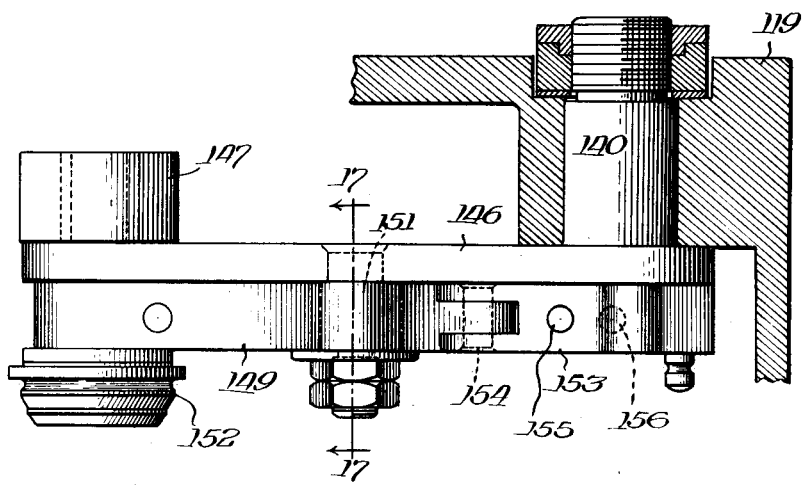
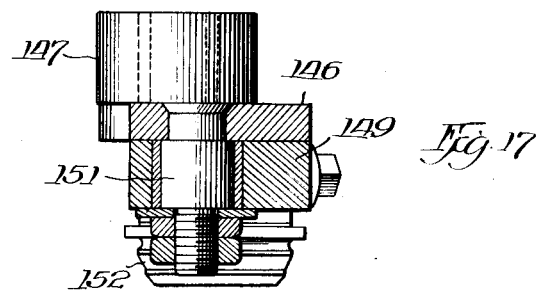

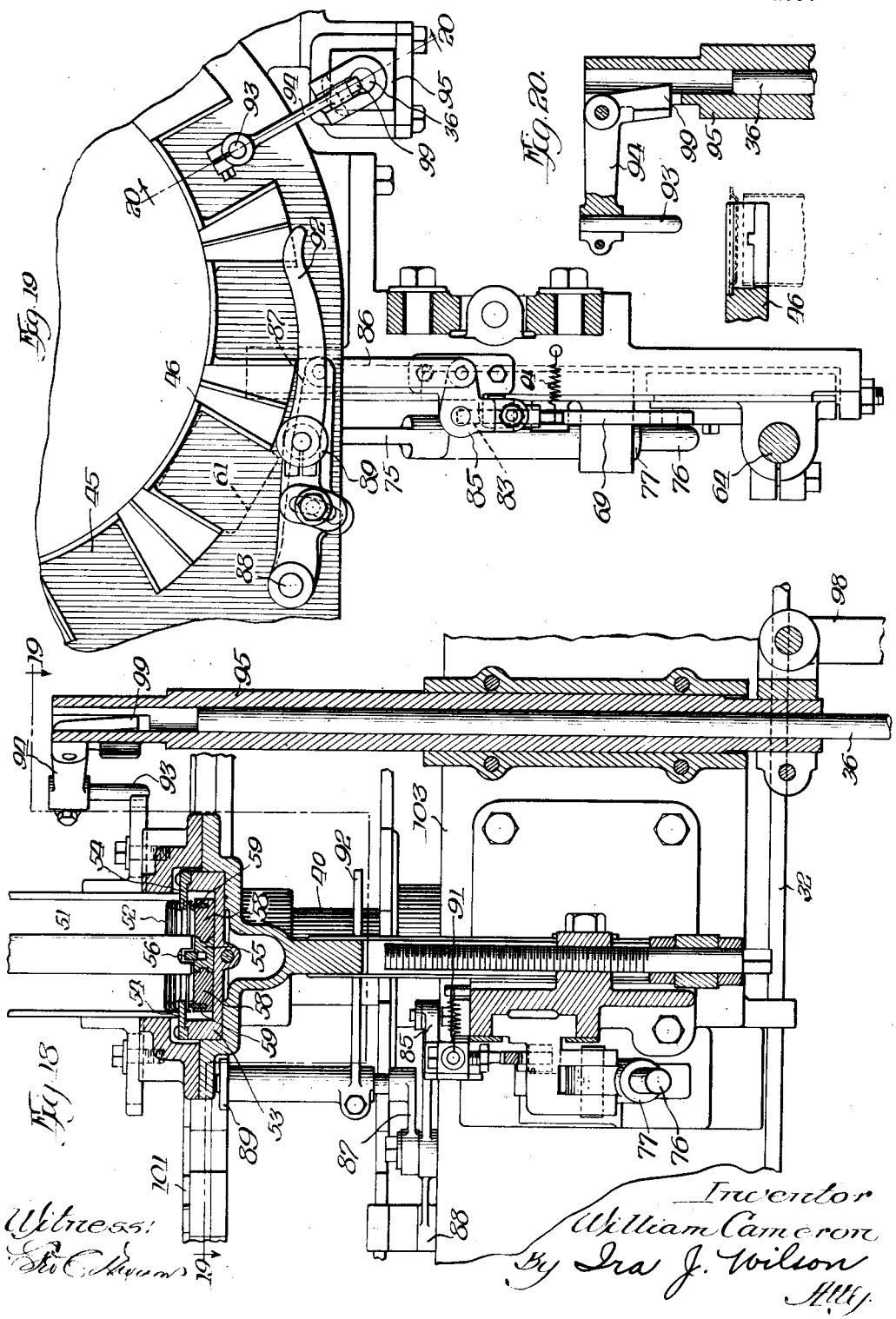

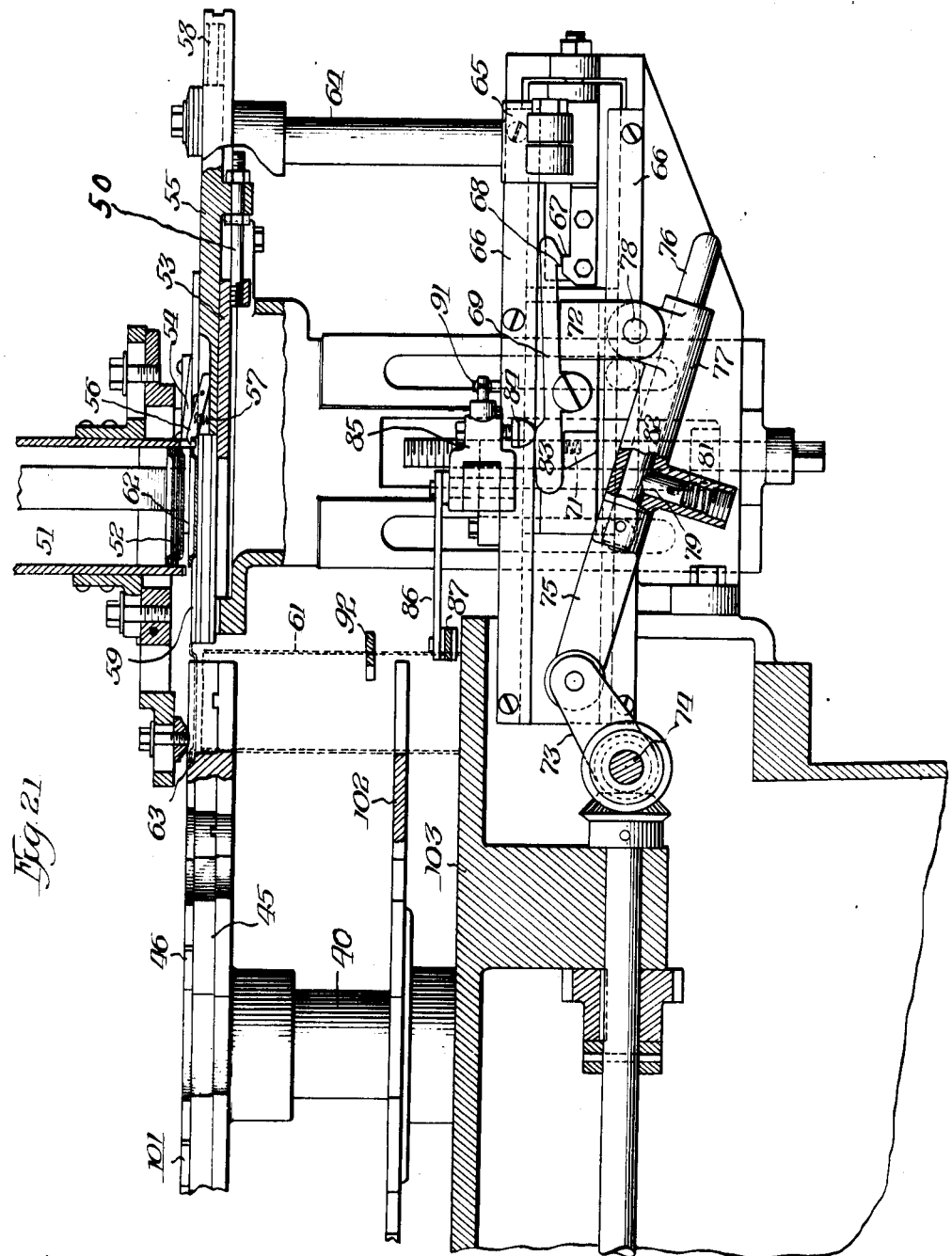

Patented Apr. 1, 1930

1,752,328

UNITED STATES PATENT OFFICE

WILLIAM CAMERON, OF CHICAGO, ILLINOIS, ASSIGNOR TO CAMERON CAN MACHINERY CO., OF CHICAGO, ILLINOIS, A CORPORATION OF ILLINOIS

SQUARE-CAN CAP-SEAMING MECHANISM

Application filed August 30, 1926. Serial No. 132,413

This invention relates in general to machines for seaming the ends onto can bodies. While some of its features are particularly adapted for the seaming of ends upon square can bodies, many of the principles are equally advantageous in connection with the seaming of ends to circular cans. The machine, with slight cam changes, may be employed for double seaming when a liquid-proof union between the body and the cap is desired, or it may be used for what is known as false seaming, where this type of union between the body and the cap is sufficient for the purposes for which the can is to be used. The machine shown and described herein as illustrative merely of my invention is adapted to perform the false seaming operation.

One of the primary objects of my invention is to provide a machine for the purpose indicated which will be entirely automatic in its operation and which will be capable of running at very high speeds so as to result in a maximum production and one which is so balanced that it will not be injured and will not wear rapidly under the high speed operation and which is so designed that the strains imposed on the various operating parts and the power required to operate the machine are both reduced to a minimum.

Another object of the invention is to provide a machine which can be quickly and readily adjusted to accommodate cans of various sizes, one in which the bodies and caps are positively fed to the machine and from which the bodies with the caps applied thereto are positively ejected from the machine, one which embodies a novel mechanism which precludes the feeding of a cap in the event that no can is fed to receive the cap, and one which includes novel mechanism for stopping the machine in the event that no cap is delivered at the proper time.

Another feature of the machine resides in the mechanism for positively holding the caps in position upon the can bodies during the time that the body and cap are being elevated into position to be operated upon by the seaming mechanism.

The mechanism which contributes toward the extremely high speed with which the machine may be operated includes two sets of seaming rolls, each set consisting of two rolls disposed on diametrically opposite sides of the can body and cap and designed to operate simultaneously so that a half revolution of the revolving head carrying the seaming rolls results in the operation of the rolls upon the entire periphery of the cap, whereas in prior square cam seaming machines with which I am familiar, an operation entirely around the periphery of the cap, required one complete revolution of the roll carrying head. It should be apparent therefore that in my present machine one revolution of the head performs twice the work that has previously been accomplished by a single revolution of a head in prior machines and the speed of production of the machine is therefore approximately doubled.

Other objects of this invention and many of its inherent advantages should be readily appreciated as the same becomes better understood by reference to the following description when considered in connection with the accompanying drawings.

Referring to the drawings:

Fig. 1 is a side elevation of a machine constructed in accordance with my invention, Fig. 2 is a fragmentary sectional view on an enlarged scale taken through the head of the machine substantially on the line 2—2 of Fig. 3, Fig. 3 is a transverse sectional view taken substantially on the line 3—3 of Figs. 1 and 2, Fig. 4 is a sectional view on the line 4—4 of Fig. 2, Fig. 5 is a vertical sectional view on the line 5—5 of Fig. 4, Fig. 6 is a sectional view on the line 6—6 of Fig. 2, Figs. 7 and 8 are detailed views of the cams for controlling the first set of seaming rolls, Figs. 9 and 10 are similar views of the cams for controlling the second set of seaming rolls, Fig. 11 is a fragmentary sectional view showing the relation between one of the first seaming rolls and a cap just prior to the beginning of a seaming operation, Fig. 12 is a similar view showing the first step in forming a false seam, Fig. 13 is a similar view showing the next step, Fig. 14 is a similar view showing the last step performed by the first set of rolls and Fig. 15 is a similar view showing the final seaming performed by the second set of rolls, Fig. 16 is a detailed view of one of the seaming roll controlling units which consists of a roll carrying arm and the roll controlling arm, Fig. 17 is a sectional view on the line 17—17 of Fig. 16, Fig. 18 is a sectional view on the line 18—18 of Fig. 3, Fig. 19 is a sectional view on the line 19—19 of Fig. 18, Fig. 20 is a fragmentary sectional view on the line 20—20 of Fig. 19, and Fig. 21 is a sectional view on the line 21—21 of Fig. 3.

Referring to the drawings more in detail, reference character 25 indicates the base of the machine upon which the various operating parts are mounted, the dial and cap feed mechanism and associated parts being vertically adjustable to accommodate can bodies of various lengths and the seaming head and associated mechanisms being carried by a column 26, also vertically adjustable, upon the base for positioning the seaming head at requisite height.

The mechanism for driving the machine may be of any preferred construction and I have illustrated merely the main drive shaft 27 to which the belt-driven pulley 28, through which power is applied to the machine, is operatively connected through a clutch 29. This clutch may be manually operated from a handle 31 on a short rod 32 which is connected to the clutch through lever 33, link 34, and shorter lever 35, or it may be operated automatically, as will be later explained, by means of a push rod 36 connected to an arm 37 of the lever 33. A brake 38, adapted to engage a hand wheel 39 is connected through suitable mechanism to the lever 33 by which it is operated, as will be apparent from Fig. 1.

The can bodies are fed to the machine from an endless belt 41 (Figs. 1 and 3) trained over suitable pulleys 42 and 43 and driven by any desired mechanism from the power shaft of the machine. It should be noted also that the same belt serves to discharge the bodies with the ends thereon from the machine, the belt being adapted to travel in the direction of the arrow indicated in Fig. 3. The incoming can bodies are carried by the belt to a position in alignment with the chute formed between the walls 44 where they are pushed laterally off from the belt through the chute into one of the pockets 45 of the spider wheel or dial 46 by a reciprocatory pusher 47 which is connected with a rack 48 for reciprocation by an oscillatory pinion 49 driven by suitable mechanism (not shown). The dial 46 is rotated in a counterclockwise direction, viewing Fig. 3, in an intermittent or step-by-step movement, the dial being carried upon a vertical shaft 40 which is actuated by suitable drive mechanism including a Geneva gear. When a can body in a dial pocket reaches a position in alignment with the cap feeding mechanism, a cap is automatically delivered into position in the pocket directly over the body so that when the body is elevated, as will be later explained, it carries the cap upwardly with it into position to be operated upon by the seaming mechanism.

The cap feeding mechanism is best shown in Figs. 1, 3, and 18 to 21 inclusive, to which reference will now be made. The caps are stacked in a vertical magazine 51, several of the caps being shown in Fig. 18 and designated 52 and a channel shaped reciprocatory slide 53 is provided at its sides with inwardly projecting rearwardly tapered separating knives 54 which separate the lowermost cap from those disposed above it. The slide 53 is connected by a rod 50 with a central slide bar 55 which carries at its forward end a pivotally mounted feed dog 56, the forward end of which, as will be evident from Fig. 21, is yieldingly urged into the position shown by a small coiled spring 57. The slide bar 55 reciprocates between the bottom pieces 58 of the magazine which are preferably equipped with supporting ribs 59 upon which the end to be fed rests.

Assuming that a can body 61 has been positioned in alignment with the cap feed mechanism, as shown in Fig. 21, and that the parts are in the position therein illustrated, it will be observed that the lowermost cap is resting upon the leaves or ribs 59, while the remainder of the stack is supported upon the forwardly extending portions 62 of the knives 54. The lowermost cap being in the path of travel of the feed dog 56, upon forward movement of the slide, that is, to the left, viewing Fig. 1, this cap will be pushed by the feed dog from the magazine, into the cap receiving pocket 63 of the dial directly over the body 61, as shown. The feeding movement of the slide carries the rear ends of the knives 54 clear of the stack of caps which then rest upon the leaves 59, but upon the return stroke of the slide, the rear edges of the knives pass between the lowermost cap and the next superposed cap thereby lifting the remainder of the stack away from the lowermost cap so that it becomes separated and ready to be fed upon the next forward movement of the slide.

The slide is operated by a post 64 which is carried by a head 65 mounted for reciprocation between suitable guides 66. This head is provided with a shoulder 67 adapted to be engaged by an opposed shoulder 68 on a pivoted hook 69 which is normally urged into engagement with the shoulder 67 by a spring 71. This hook member is pivoted on a cross-head 72 which is reciprocated from a crank 73 on the shaft 74 through the medium of a releasable link connection including the member 75, equipped with an extension rod 76 which is encircled by a sleeve 77 pivotally connected to cross head 72 at 78 and releasably connected to the rod 76 by a tapered plunger 79 which is yieldingly urged by a spring 81 into a correspondingly shaped notch 82 formed in the rod 76. In the event of a jam, so that excessive strain is imposed upon the feed mechanism, the plunger 79 will be forced out of the notch 82 against the force of spring 81, thereby permitting the cross head and the feed slide, which are operated thereby, to remain idle, while the arm 73 continues to revolve.

In order to preclude the feeding of a cap when there is no can body positioned in the dial to receive such cap, I have provided a "no can, no cap" feature which consists of mechanism for disengaging the hook shoulder 68 from the shoulder 67 and which will now be described. Referring particularly to Figs. 19 and 21, it will be observed that the tail 83 of the hook 69 is adapted to be engaged by a head 84, adjustably carried by a bell crank lever 85 which is connected by a link 86 with a feeler arm 87 pivoted at 88 and carrying a roller 89 adapted to be engaged by the can bodies as they pass in succession in their respective dial sockets. Engagement of the roller with the can body swings the bell crank 85 so as to dispose the head 84 out of the path of the tail 83. Therefore, so long as can bodies are being fed, the hook 69 will be engaged with the shoulder 67 and the cap feed slide will be operated. A spring 91 connected with the bell crank lever 85 tends to swing this lever so as to dispose the head 84 into the path of the tail 83 and should an empty dial socket be opposed to roller 89, the lever 87 will be permitted to swing in a counterclockwise direction about its pivot 88 under the influence of its spring 91 so as to dispose the head 84 in the path of the tail 83 with the result that upon movement of the hook 69 to the right, this head will engage the cam surface of the tail and rock the hook on its pivot so as to disengage the shoulder 68 from its pivot 67, thereby disconnecting the cap feed slide from the power. An extension 92 disposed above but fixed to the lever 87, serves to limit the inward movements of the roller 89, and thereby obviates chattering of the parts and causes them to operate more evenly and quietly.

It will be apparent that so long as each dial socket is supplied with a cam body, the cap feed mechanism will operate to deliver a cap to each body, but if any socket fails to receive a body, the cap feed mechanism will be temporarily disconnected, so that no cap will be fed to that particular socket.

For the purpose of precluding the delivery of a can body to the seaming mechanism, when, for any reason no cap has been fed in the position to be applied to the body, I have provided a stop mechanism which will now be described. This stop mechanism, as illustrated in Figs. 1, 18, 19, and 20, comprises a feeler finger 93 carried by a bell crank 94 which is fulcrumed upon a vertically reciprocatory sleeve 95 adapted to be reciprocated on the machine frame by means of a crank pin 96 which is revolved by shaft 97 and is connected with the sleeve 95 through a connecting rod 98. The stop rod 36 previously mentioned extends upwardly within the sleeve 95 and the extent of reciprocation of the sleeve is such that when the parts are in the position shown in Figs. 18 and 20, the tail 99 of the bell crank will, upon downward movement of the sleeve, engage the end of the rod 36 and push this rod downwardly, thereby disengaging the clutch and causing the brake 38 to engage wheel 39 to stop the machine.

The finger 93, as will be evident from Fig. 19, is disposed over the path of travel of the dial socket and upon downward movement of the sleeve 95 this finger is brought downwardly into the socket. If a cap is positioned in the socket, as shown in Fig. 20, engagement of this finger 93 with this cap will rock the bell crank 94 so as to swing its tail 99 outwardly to clear the end of the rod 36, and under these conditions no actuation of the rod will be effected. In the event, however, of the absence of a cap from the dial socket, the finger 93 will continue downwardly into the open can body, the tail 99 will engage the end of the rod 36, and this rod will be depressed to thereby stop the machine. It will be apparent that from this construction, the machine will be stopped whenever a dial socket without any cap in it is disposed beneath the feeler finger, so that any possibility of delivering a can body without a cap to the sealing mechanism is obviated.

Referring now to Fig. 2, it will be observed that the dial which has heretofore been designated generally by reference character 46 comprises the uper disk 101 and the intermediate disk 102 both provided with sockets for the reception of can bodies, and a lower disk or table 103 upon which the can bodies are supported. This table is provided, in alignment with the sockets 45, with disks or can body supporting chucks 104 upon which the can bodies rest. These chucks are normally disposed flush with the table 103 as shown in Fig. 2, but as the sealing station is approached, the chuck is elevated by well known cam mechanism (not shown) so as to lift the can and the superposed cap into engagement with the upper seaming chuck 105 which is stationarily mounted and which is bolted or otherwise secured to a control cam member 106 which is fixed to the lower end of a sleeve 107 suspended from the head 108 which rests upon the upper end of the guide 109. A push rod 111 extending through the sleeve 107 carries at its lower end a holding and ejecting head 112 which is projected below the chuck into engagement with the cap just prior to the elevation of the can body into engagement with the cap. This push rod is operated by a lever 113 in turn actuated by a rod 114 from a cam (not shown) in the base of the machine, the cam being designed to project the head 112 downwardly at the proper time and then to retract in timed relation to the elevation of the body and cap, so that during the raising of the body and cap into seaming position, the cap is held firmly against the body. The head 112 is slidably mounted upon the lower end of the push rod 111 and a coiled expansion spring 115 is employed to yieldingly urge the head downwardly so as to insure pressure against the cap and also obviate any injury to the cap. A second sleeve 116 surrounding the sleeve 107, is disposed between the cam 106 and the head 108 and is firmly clamped within the guide 109 which is split for this purpose, one of the clamping bolts being shown on Fig. 1 and indicated by reference character 117. This sleeve is also further secured to the guide and held against rotation by a dowel pin 118 driven into an opening intersecting the guide and the sleeve. This sleeve 116 carries the weight of the seaming head 119, which is rotatably carried upon the sleeve, through ball bearings 121.

The head 119 surrounds the sleeve 116 with a bearing sleeve 122 interposed between them and a thrust collar 123 is locked to the sleeve 116 above the head. The head is driven by a gear 124 keyed to its upper end and meshing with and driven by a gear 125 fixed to the sleeve 126 which is splined upon a vertical drive shaft 127, the upper end of the drive shaft and the sleeve being journaled in suitable bearings 128 formed in the column 26. A second drive gear 129 also fixed to the sleeve 126 drives a gear 131 which surrounds and is rotatably carried by the intermediate portion of the head 119. To the hub of this gear are fixed the seaming cams by means of which the seaming rollers are moved toward and withdrawn from the cans being operated upon. These cams are designated on the drawings by reference characters 132, 133, 134 and 135 respectively and are shown in detail in Figs. 7 to 10 inclusive. It will be observed that the ratios between gears 124, 125 and 129, 131, are such that the head, driven by gear 124, while driven in the same direction as gear 131 carrying the seaming cams is rotated at a higher rate of speed so that the requisite relative movement between the seaming cams and the seaming mechanisms which they operate, is secured.

The relative relation of the superposed seaming cams is shown in Fig. 6 and in this figure is also shown the bell crank levers which are actuated by these cams to control the position of the seaming rollers.

Referring to Figs. 2 and 6, it will be observed that at diametrically opposite points, the seaming head has a pair of vertically disposed rock shafts 136 journaled on it. To the upper end of each rock shaft 136 is pinned a bell crank lever comprising an upper lever arm 137 disposed in the plane of the cam 132 and a lower lever arm 138 disposed in the plane of the cam 133. Similarly, the head is provided with another pair of rock shafts 139 to the upper ends of which are pivoted bell crank levers 141 (Figs. 5 and 6) comprising upper levers 142 disposed in the plane of cam 134 and lower levers 143 disposed in the plane of the cam 135. The lower end of each of the four rock shafts is provided with a lever 144 carrying a roller or cam follower 145 adapted to actuate its corresponding seaming roller arm as will be later described.

From Figs. 4 to 6 inclusive and 16 and 17, it will be observed that in the seaming head 119 there are journaled four rock shafts 140, each carrying at its lower end, within the head, a control arm 146 which is provided at its inner end with a cam follower 147 adapted to travel in the cam track 148 (Fig. 4) formed in the stationary cam member 106 previously mentioned. While the seaming head, carrying the arms, revolves around the stationary cam member, the arms 146 controlled by the followers 147 follow in a general way the contour of the can body and cap to be operated upon.

By reference to Figs. 4, 5, 16 and 17, it will be apparent that each control arm 146 carries a seaming arm 149 which is fulcrumed to the control arm intermediate its ends upon a pin or fulcrum 151. The outer end of each seaming arm is provided with a seaming roller 152 by which a seaming operation is performed. Near its other end each seaming arm is provided with an adjustable cam shaped portion 153 pivoted upon a pin 154 and rigidly held in adjusted position with respect to the main portion of the arm 149 by means of an adjusting screw 155 threaded into the adjustable portion 153 and a set screw 156 threaded through the arm and abutting the adjustable portion. A tension spring 157 connected to the outer end of each arm 149 tends to rock its arm 149 so as to hold the seaming roll outwardly in inoperative position. The arms controlled by rock shafts 136 (Fig. 4) carry the primary seaming rollers 158 while the arms controlled by the rockshaft 139 carry the final seaming rollers 152, the former being shown in Fig. 2 and the latter in Fig. 5.

The primary seaming rolls 158 are controlled by the cams 132 and 133 which are designed as shown in Figs. 7 and 8 to press the seaming rolls toward the can body in three successive steps by reason of the cam portions indicated by reference characters 161, 162, and 163 respectively. The cams are designed so that at each one-half revolution of the seaming head, which because there are two seaming rolls operating simultaneously on opposite sides of the can body thereby completing an operation around the entire periphery of the body at each half revolution of the head, the rolls are forced inwardly against the cap and body being operated upon. In the present machine, one and one-half revolutions of the head, therefore, completes the operations of the primary seaming roll, whereupon, as soon as that portion of the cap which has been completed by the first rolls comes opposite the final rolls, these rolls, under the influence of cam 134 are brought into operative position even before the primary rolls have completed their work and been released so that for a short period, both the primary and final seaming rolls are operating simultaneously. A half revolution of the seaming head completes the operations of the final seaming rolls, whereupon all of the rolls are released.

In connection with the seaming operation, it will be observed that the control arms 146 through the followers 147 which are actuated by the control cam 106 causes the seaming rollers to follow in a general way the contour of the can body and cap. The seaming rolls are actually forced to and held in operative position against the perimeter of the cap by the seaming cams illustrated in Figs. 7 to 10 inclusive. From Fig. 4 it will be manifest that the arms 144 are so designed that when they are swung into the operative position shown at the right and left sides of Fig. 4 they stand at substantially right angles to the axes of the seaming arms 149, thereby taking the thrust of these levers directly against the shafts 136 so that the cams are relieved of any excessive strain under the heavy duty performed. The action between the arms 144 and the seaming arms is in effect a toggle action and the toggles are practically straightened out when the greatest strain is imposed so that the wear on the moving parts and resultant strains are reduced to a minimum. The rolls 158 controlled by the shafts 139 are shown in Figs. 2 and 4 as being in inoperative position, while the rolls 152 controlled by the shafts 136 are shown in Figs. 4 and 5 as being in operative position. Furthermore, the curved portions of the adjustable piece 153 of each arm 149 against which the roller 145 of its respective arm 144 rests is so positioned that its point of contact is substantially on the axis of oscillation of the lever carrying studs 140 with the result that oscillation of the levers under the influence of the cam followers 147 produces practically no strain and very little wear upon the contacting parts 145 and 153.

The positions that the seaming rolls assume in performing the false-seaming operations illustrated in this application are shown in Figs. 11 to 15 inclusive. When the can body and cap thereon are elevated into engagement with the upper chuck 105 and are in position to be seamed, both sets of seaming rolls 158 and 152 are disposed in inoperative position to permit the body and cap to enter between them. This position of one of the primary seaming rolls 158 is illustrated in Fig. 11. At this time the levers 138 which, through the cam follower arms 146, control the rolls 158 are engaged with the dwell portions 171 of the cam 133. The other levers 137 are at this time in engagement with dwell portions 172 of the cam 132.

The seaming head in its rotation in a counterclockwise direction at a higher speed than the travel of the seaming cams brings the arms 142 into engagement with the first rise 161 in the cam 133, and simultaneously the arms 143 ride down the cam 132 onto the surfaces 173. The bell cranks are thereby rocked to swing the seaming rolls 158 toward the cap into the position shown in Fig. 12 to perform the initial operation as therein shown. Further relative movement between the seaming head and the cams brings the arms 142 and 143 into engagement with the surface 162 and 174 on the cams 133 and 132, thereby moving the seaming rolls 158 inwardly still further to perform the operation illustrated in Fig. 13. Continued relative movement between the seaming head and the cams brings the arms 142 and 143 onto the surfaces 163 and 175 respectively of the cams 133 and 132, thus positioning the rolls 158 to perform the operation illustrated in Fig. 14. Further relative movement brings the arms into engagement with dwell surfaces 171 and 172 of the cans respectively, whereby the primary seaming rolls are retracted or moved away from the cap into inoperative position.

Before the primary seaming rolls have quite completed their operation, the secondary seaming rolls 152 are moved into operative position by engagement of the arms 138 with the high surfaces 176 of the cam 134, this movement being permitted by reason of the depressed surfaces 177 in the cam 135 into which the arms 137 ride. The operative position of one of the rolls 152 is illustrated in Fig. 15.

It will be manifest, therefore, that the seaming rolls are positively moved into and held in operative position by the primary and final seaming cams 132 and 135, and that the pairs of rolls are positively retracted by the primary and final retracting cams 133 and 134. The rolls, therefore, are positively actuated in both directions, leaving nothing to the uncertain action of springs. This feature of the positive actuation and control of the rolls also contributes in some measure to the high speed and accuracy of the machine. The fact that the arms 144 are disposed at right angles to the seaming levers when the rolls are in their innermost positions is also of considerable importance for the reason that the seaming rolls are always forced inwardly to exactly the same position, which insures accuracy of operation and uniformity and perfection in all of the seams produced.

The operatons just described exemplify the attachment of the cap to the can body by a false seam which is sufficiently tight for many uses to which cans may be put. When a true double seam is required, as for instance on cans adapted to contain liquid, the bodies are preliminarily flanged and another set of seaming cams is substituted for those herein illustrated, which are designed to cause four instead of three successive actions of the primary seaming rolls, and two instead of one final actions of the final seaming rolls.

After the seaming operations have been performed, the can bodies with the caps applied thereto are lowered onto the table of the spider and carried by the spider to the position indicated on Fig. 3 by reference character 178. At this position they are withdrawn readily from the spider by an ejector including a finger 179 adapted to engage the inner side of the body and pull the body readily outwardly from its spider pocket. The ejector is connected to a reciprocatory rack 181 meshing with the oscillatory pinion 49 similarly to the feeding rack 48. As the bodies are successively removed from the dial they are fed upon the belt 41 by which they are delivered from the machine in a position in line with that from which they were fed into the machine.

The operation of my novel machine having been set forth to a considerable extent in connection with the description of parts, it is believed that a brief description of the operation as a whole will suffice for an adequate understanding. Assuming that the cap magazine is supplied with caps and that can bodies are being fed in succession to the conveyor belt 41, these bodies are fed into the pockets 45 of the dial and moved to a position in proximity to the cap magazine, where a cap is delivered from the magazine into the cap socket of the dial directly over the body. The "no-can no-cap" mechanism previously described prevents the delivery of a cap to any socket which does not contain a body.

During further movement of the dial the feeler finger 93 is moved downwardly to determine the presence or absence of a cap in the socket. If a cap is present the arm 99 of the bell crank is displaced from the path of the rod 36 and the machine continues in operation. If, however, no cap is present the machine rod 36 is depressed, thereby throwing out the clutch and applying the brake to stop the machine.

When a body with a superimposed cap reaches the seaming station, the knockout head 112 is depressed into engagement with the cap and the body, the can, cap, and head are elevated together by the lower chuck 104 into seaming position and engagement with the upper chuck 105. During the seaming operation the body and cap are clamped together between these chucks.

The seaming operations are then performed by the primary and final seaming rolls in the manner previously described, the two primary rolls acting simultaneously upon opposite sides of the can, and the two final seaming rolls also acting simultaneously beginning during the final operations of the primary rolls and continuing after the primary rolls cease functioning. The body with the cap seamed thereto is then lowered. During the lowering the knockout head 112 is again depressed to positively depress the can body and preclude its adherence to the upper chuck 105.

After being lowered to normal position on the dial, the body with the cap thereto is delivered from the machine onto the delivery belt 41, as has been previously explained.

The foregoing description has referred to the can bodies as being square, but it should be understood that the word "square" has been used merely as illustrative and as distinguishing from round cans and is intended to include within its scope oval, and in fact all shapes except cylindrical or round cans.

It is believed that my invention and many of its inherent advantages will be understood and appreciated from the foregoing without further description, and while I have shown and described a preferred embodiment of the invention, it should be manifest that the principles thereof may be incorporated in machines diverging materially in their structural details from those illustrated and described. Consequently, the invention is circumscribed only by the scope of the following claims.

I claim:

1. A can seaming machine including a pivotally mounted control arm, a carrying arm fulcrumed thereon, a bearing member having a bearing surface adjustably mounted on said carrying arm, and an oscillatory arm movable into a position against said bearing surface so that the point of contact between said bearing surface and arm is substantially coaxial with the pivot of the control arm and the pressure of said surface is exerted axially of said oscillatory arm.

2. A can seaming machine including a pivotally mounted control arm, a carrying arm fulcrumed thereon, an adjustable member provided with an arcuate surface pivotally mounted on said carrying arm, means for positively adjusting the position of said member, an oscillatory arm engageable with said surface, and means for moving said arm into engaging position so that the point of contact between said arm and surface is coaxial with the pivot of said control arm and the axis of said oscillatory arm is substantially perpendicular to the axis of said carrying arm.

3. In a can seaming machine the combination of a turret provided with can body and cap receiving sockets, means for imparting a step-by-step rotary movement to said turret, a cap magazine, a reciprocatory slide, means carried by the slide for feeding a cap from said magazine to a turret socket upon movement of the slide in one direction and for separating the lowermost cap from the stack upon movement of the slide in the opposite direction, mechanism for operating said slide, and means for rendering said mechanism inoperative upon the absence of a can body from a predetermined turret socket.

4. In a can seaming machine the combination of a rotatable turret provided with can body and cap receiving sockets, a reciprocatory cap feeding slide, a reciprocatory cross head for actuating said slide, a releasable connection between said cross head and slide, and means controlled by the presence or absence of a can body in the turret for releasing said connection.

5. In a can seaming machine the combination of a can body feeding turret, a cap feeding slide, a reciprocatory cross head, means including a pivotally mounted shouldered member for connecting said cross head to said slide, means adapted to be positioned in the path of said shouldered member to release the same from driving connection with the slide upon absence of a can body from said turret, and means including interengaging parts releasable under excessive resistance for normally actuating said slide, but automatically rendered inoperative when excessive strains are imposed.

6. In a can seaming machine the combination of a rotatable turret provided with can body and cap receiving sockets, means for automatically feeding bodies and caps to said sockets, a reciprocatory member, a bell crank pivoted on said member and provided at one end with a feeler finger and at the other end with a shoulder, means for reciprocating said member to move said finger into engagement with a cap in said turret whereby said bell crank is rocked to displace said shoulder, and stop mechanism including a stationary member, disposed in the path of travel of said shoulder whereby said machine is stopped in the event of failure of said shoulder to be displaced.

7. In a can seaming machine the combination of a turret adapted to receive can bodies and caps, means for feeding can bodies and caps thereto, a reciprocatory feeler finger adapted to detect the presence or absence of a cap in said turret, a shoulder movable into inoperative position upon engagement of said finger with a cap, and means operable by said shoulder to stop the machine in the event of absence of the cap.

8. In a non-circular-can seaming machine the combination of a rotatable seaming head, a pair of primary seaming rolls and a pair of final seaming rolls carried thereby, a control cam for causing said rolls to follow the general contour of a cap to be seamed, and means for positively moving the rolls of each pair toward each other predetermined distances and for causing the pairs of rolls to operate in predetermined succession, said final rolls being moved into engagement with the cap before the primary rolls have finished their operation.

9. In a non-circular can seaming machine the combination of a rotatable seaming head, a pair of primary seaming rolls and a pair of final seaming rolls carried thereby, a control cam for causing said rolls to follow the general contour of a cap to be seamed, and means for positively operating the pairs of rolls in predetermined succession, said final rolls being moved into engagement with the cap before the primary rolls have finished their operation.

10. In a can seaming machine, the combination of a seaming roll carrying arm, means for pivotally supporting said arm in proximity to a can, a seaming roll mounted on said arm, said arm provided with a bearing surface spaced from said roll, a pivoted arm adapted to engage said bearing surface, and means for disposing the latter arm substantially at right angles to the axis of said carrying arm to hold said seaming roll in operative position.

11. In a seaming machine, the combination of a pivotally mounted control arm, a seaming roll carrying arm fulcrumed thereon, a seaming roll mounted on one end of said carrying arm, an adjustable member provided with a bearing surface carried by the other end of said arm, means for adjusting said member, a pivotally mounted arm provided with a roller for engaging said surface, and means for moving said last named arm so as to dispose said roller in engagement with said surface in such position that the thrust of said surface against the roller is along the longitudinal axis of said arm whereby said seaming roll carrying arm is held with the seaming roll in operative position.

12. In a can seaming machine, the combination of a pivotally mounted control arm, a seaming roll carrying arm fulcrumed thereon between its ends, a seaming roll carried at one end of said arm, an adjustable bearing surface at the other end of said arm, and a pivotally mounted arm adapted to be swung in an arc into engagement with said surface to swing the carrying arm on its fulcrum and hold the seaming roll in operative position, the point of contact between said pivotally mounted arm and said bearing surface being substantially coaxial with the pivot of said control arm to permit of oscillatory movements of said control arm and carrying arm as a unit.

13. A can seaming machine including a pivotally mounted control arm, a carrying arm fulcrumed thereon, an adjustable member at one end of said carrying arm providing a bearing surface, means for positively adjusting the position of said member with respect to said arm, a pivotally mounted arm engageable with said surface, and means for moving said last named arm into a holding position wherein the thrust of said bearing surface is exerted along a radius of the arc in which said pivotally mounted arm is movable.

14. In a can seaming machine, the combination of a rotatable seaming head, means for holding a can body in cooperative relation thereto, a plurality of pairs of seaming rolls carried by said head, the rolls of each pair being disposed upon diametrically opposite sides of the axis of said head, a stationary contour cam, means operable by said cam for causing said seaming rolls to follow the general contour of the can body to be seamed, control cams mounted coaxially with said head, and means actuated by said cams for causing the rolls of each pair to operate simultaneously and for causing said pairs of rolls to operate in succession upon a cam body, the operation of one pair of rolls being initiated prior to the completion of the operation of the other set of rolls.

15. In a can seaming machine, the combination of a rotatable seaming head, a plurality of pairs of seaming rolls carried thereby, a contour cam, means operable by said cam for causing the rolls to follow the general contour of a can body, and means for causing the rolls of each pair to operate simultaneously and the pairs of rolls to operate in succession, the operation of one pair continuing until the operation of the succeeding pair has been begun, said means comprising pivotally mounted roll carrying arms, a plurality of control cams, and means operable by said cams for actuating said carrying arms and positively holding the same to maintain their respective seaming rolls in unyielding engagement with the can body.

16. In a can seaming machine, the combination of a seaming head, a plurality of pairs of seaming rolls carried thereby, and means for moving said rolls into and out of operative position, said means for each roll comprising a pivotally mounted control arm, a carrying arm pivoted on said control arm, a seaming roll mounted on one end of said carrying arm, an adjustable bearing member mounted on the other end of said carrying arm, means for adjusting said member, a holding arm mounted to swing in an arc into engagement with said bearing member, a spring for urging said bearing member toward said holding arm, and cam means for swinging said last mentioned arm, said parts being constructed to dispose the longitudinal axis of the holding arm perpendicular to the point of contact with said bearing member whereby the thrust of said bearing member is exerted along the longitudinal axis of said arm.

17. In a non-circular-can seaming machine the combination of a rotatable seaming head, means for holding a cap in position to be seamed, a plurality of pairs of lever arms carried by said head, a plurality of pairs of seaming rolls carried by said arms, the rolls of each pair being disposed diametrically opposite to each other, means releasably engageable with said arms for causing the pairs of rolls to move into operative engagement with a cap, and means for positively urging said releasably engageable means into and out of operative engagement with said arms for causing the pairs of rolls to operate upon the cap in succession, one pair beginning before the other pair has finished and the rolls of each pair to operate simultaneously.

18. In a non-circular-can seaming machine in combination, a rotatable seaming head, means for holding a cap in position to be seamed, a plurality of pairs of lever arms pivotally carried by and horizontally disposed on said head, a plurality of pairs of seaming rolls carried by said arms with their axes substantially perpendicular to said arms, the rolls of each pair being disposed substantially diametrically opposite to each other, means releasably engageable with an end portion of each of said arms for causing the pairs of rolls to move into operative engagement with the material to be seamed, and means for urging said releasably engageable means into and out of operative engagement with said arms for causing the pairs of rolls to operate upon the material in succession, the operation of one pair overlapping in time the operation of the other pair.

19. In a non-circular-can seaming machine in combination, a rotatable seaming head, means for holding a cap in position to be seamed, a plurality of pairs of seaming rolls carried by said head, means for causing the rolls of one pair to approach each other by predetermined steps at each half revolution of the head, and means for causing the rolls of the second pair to approach each other prior to the completion by the first pair of their seaming operation.

20. In a can seaming machine the combination of a turret adapted to receive a can body and a cap therefor, seaming mechanism for attaching said cap to said body, a feeler finger, means for moving said finger transversely to the plane of a cap in said turret for detecting the presence or absence of a cap therein, and means controlled by said finger for rendering the machine inoperative in the event of the absence of a cap from said turret.

In witness of the foregoing I affix my signature.

WILLIAM CAMERON.